US008489390B2

(12) United States Patent
Arumugam et al.

(10) Patent No.: US 8,489,390 B2
(45) Date of Patent: Jul. 16, 2013

(54) SYSTEM AND METHOD FOR GENERATING VOCABULARY FROM NETWORK DATA

(75) Inventors: Thangavelu Arumugam, San Jose, CA (US); Satish K. Gannu, San Jose, CA (US); Virgil N. Mihailovici, San Jose, CA (US); Ashutosh A. Malegaonkar, Milpitas, CA (US); Christian Posse, Foster City, CA (US); Sonali M. Sambhus, Milpitas, CA (US); Nitasha Walia, San Jose, CA (US); Kui Zhang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 12/571,390

(22) Filed: Sep. 30, 2009

(65) Prior Publication Data

US 2011/0077936 A1    Mar. 31, 2011

(51) Int. Cl.
    *G10L 19/00*    (2006.01)
(52) U.S. Cl.
    USPC ...................................................... 704/200.1
(58) Field of Classification Search
    USPC ...................................................... 704/200.1
    See application file for complete search history.

(56) References Cited

U.S. PATENT DOCUMENTS

| 5,613,032 | A | 3/1997 | Cruz et al. |
| 5,677,901 | A | 10/1997 | Iwamura |
| 5,857,179 | A | 1/1999 | Vaithyanathan et al. |
| 5,961,582 | A | 10/1999 | Gaines |
| 6,012,053 | A | 1/2000 | Pant et al. |
| 6,026,388 | A | 2/2000 | Liddy et al. |
| 6,301,586 | B1 * | 10/2001 | Yang et al. ............... 1/1 |
| 6,304,283 | B1 | 10/2001 | Kitagawa |
| 6,345,253 | B1 | 2/2002 | Viswanathan |
| 6,697,793 | B2 * | 2/2004 | McGreevy ............... 1/1 |
| 7,017,183 | B1 | 3/2006 | Frey et al. |
| 7,072,837 | B2 | 7/2006 | Kemble et al. |
| 7,099,867 | B2 | 8/2006 | Okada et al. |

(Continued)

FOREIGN PATENT DOCUMENTS

| WO | WO02/42864 | 5/2002 |
| WO | WO02/042940 | 5/2002 |
| WO | WO2011/041443 | 4/2011 |
| WO | WO2012/173780 | 12/2012 |

OTHER PUBLICATIONS

U.S. Appl. No. 12/762,194, filed Apr. 16, 2010, entitled "System and Method for Deducing Presence Status from Network Data," Inventor(s): Thangaveiu Arumugam, et al.

(Continued)

*Primary Examiner* — Jakieda Jackson
(74) *Attorney, Agent, or Firm* — Patent Capital Group (57) ABSTRACT

A method is provided in one example and includes receiving data propagating in a network environment and separating the data into one or more fields. At least some of the fields are evaluated in order to identify nouns and noun phrases within the fields. The method also includes identifying selected words within the nouns and noun phrases based on a whitelist and a blacklist. The whitelist includes a plurality of designated words to be tagged and the blacklist includes a plurality of rejected words that are not to be tagged. A resultant composite is generated for the selected nouns and noun phrases that are tagged. The resultant composite is incorporated into the whitelist if the resultant composite is approved.

29 Claims, 3 Drawing Sheets

U.S. PATENT DOCUMENTS

| | | | |
|---|---|---|---|
| 7,260,312 B2 | 8/2007 | Srinivasan et al. | |
| 7,292,532 B2 | 11/2007 | Sakata et al. | |
| 7,350,227 B2 | 3/2008 | McGrew et al. | |
| 7,417,959 B2 | 8/2008 | Dorner et al. | |
| 7,457,808 B2 * | 11/2008 | Gaussier et al. | 1/1 |
| 7,493,369 B2 | 2/2009 | Horvitz et al. | |
| 7,509,491 B1 | 3/2009 | Wainner et al. | |
| 7,698,442 B1 | 4/2010 | Krishnamurthy et al. | |
| 7,706,265 B2 | 4/2010 | Monette et al. | |
| 7,809,714 B1 | 10/2010 | Smith | |
| 7,818,215 B2 * | 10/2010 | King et al. | 705/26.1 |
| 7,827,191 B2 | 11/2010 | Williams | |
| 7,853,553 B2 | 12/2010 | Lankinen et al. | |
| 7,913,176 B1 | 3/2011 | Blattner et al. | |
| 8,015,250 B2 | 9/2011 | Kay | |
| 8,051,204 B2 | 11/2011 | Kai et al. | |
| 8,214,209 B2 | 7/2012 | Nagatomo | |
| 8,260,774 B1 | 9/2012 | Aggarwal | |
| 2002/0032772 A1 | 3/2002 | Olstad et al. | |
| 2002/0035605 A1 | 3/2002 | McDowell et al. | |
| 2003/0014448 A1 | 1/2003 | Castellanos et al. | |
| 2003/0014586 A1 | 1/2003 | Mitsuda et al. | |
| 2003/0028896 A1 | 2/2003 | Swart et al. | |
| 2003/0033288 A1 * | 2/2003 | Shanahan et al. | 707/3 |
| 2003/0093789 A1 | 5/2003 | Zimmerman et al. | |
| 2004/0158609 A1 | 8/2004 | Daniell et al. | |
| 2004/0193426 A1 | 9/2004 | Maddux et al. | |
| 2004/0208123 A1 | 10/2004 | Sakata et al. | |
| 2004/0258396 A1 | 12/2004 | Nakamura et al. | |
| 2005/0060283 A1 | 3/2005 | Petras et al. | |
| 2005/0068167 A1 | 3/2005 | Boyer et al. | |
| 2005/0108001 A1 | 5/2005 | Aarskog | |
| 2005/0160166 A1 | 7/2005 | Kraenzel | |
| 2006/0150253 A1 | 7/2006 | Feuerstein et al. | |
| 2007/0016583 A1 | 1/2007 | Lempel et al. | |
| 2007/0118275 A1 | 5/2007 | Qi et al. | |
| 2007/0198725 A1 | 8/2007 | Morris | |
| 2007/0239837 A1 | 10/2007 | Jablokov et al. | |
| 2007/0244892 A1 | 10/2007 | Narancic | |
| 2007/0260684 A1 | 11/2007 | Sharma et al. | |
| 2007/0266020 A1 * | 11/2007 | Case et al. | 707/5 |
| 2007/0294265 A1 | 12/2007 | Askew et al. | |
| 2008/0027981 A1 | 1/2008 | Wahl | |
| 2008/0065892 A1 | 3/2008 | Bailey et al. | |
| 2008/0091670 A1 | 4/2008 | Ismalon | |
| 2008/0097985 A1 | 4/2008 | Olstad et al. | |
| 2008/0126690 A1 | 5/2008 | Rajan et al. | |
| 2008/0140674 A1 | 6/2008 | Ishikawa | |
| 2008/0154873 A1 | 6/2008 | Redlich et al. | |
| 2008/0184326 A1 | 7/2008 | Nakajima | |
| 2008/0222142 A1 | 9/2008 | O'Donnell | |
| 2008/0244740 A1 | 10/2008 | Hicks et al. | |
| 2008/0295040 A1 | 11/2008 | Crinon | |
| 2009/0006333 A1 | 1/2009 | Jones et al. | |
| 2009/0049053 A1 | 2/2009 | Barker et al. | |
| 2009/0055175 A1 | 2/2009 | Terrell et al. | |
| 2009/0182727 A1 | 7/2009 | Majko | |
| 2009/0196570 A1 | 8/2009 | Dudas et al. | |
| 2009/0226870 A1 | 9/2009 | Minotti | |
| 2009/0254572 A1 | 10/2009 | Redlich et al. | |
| 2009/0276377 A1 | 11/2009 | Dutta et al. | |
| 2009/0293016 A1 | 11/2009 | Potevin et al. | |
| 2009/0319365 A1 | 12/2009 | Waggoner et al. | |
| 2009/0327271 A1 | 12/2009 | Amitay et al. | |
| 2010/0010968 A1 | 1/2010 | Redlich et al. | |
| 2010/0057815 A1 * | 3/2010 | Spivack et al. | 707/794 |
| 2010/0153855 A1 | 6/2010 | Roberts et al. | |
| 2010/0179801 A1 * | 7/2010 | Huynh et al. | 704/1 |
| 2010/0223581 A1 | 9/2010 | Manolescu et al. | |
| 2010/0223629 A1 | 9/2010 | Appelbaum et al. | |
| 2010/0250547 A1 * | 9/2010 | Grefenstette et al. | 707/740 |
| 2010/0274815 A1 | 10/2010 | Vanasco | |
| 2010/0280985 A1 | 11/2010 | Duchon et al. | |
| 2011/0078167 A1 | 3/2011 | Sundaresan et al. | |
| 2011/0099195 A1 | 4/2011 | Patwardhan et al. | |
| 2011/0119264 A1 | 5/2011 | Hu et al. | |
| 2011/0161409 A1 | 6/2011 | Nair et al. | |
| 2011/0173260 A1 | 7/2011 | Biehl et al. | |
| 2011/0208522 A1 | 8/2011 | Pereg et al. | |
| 2011/0225048 A1 | 9/2011 | Nair | |
| 2011/0231296 A1 | 9/2011 | Gross et al. | |
| 2011/0252330 A1 | 10/2011 | Catlin et al. | |
| 2011/0270709 A1 | 11/2011 | Lewis et al. | |
| 2011/0304685 A1 | 12/2011 | Khedouri et al. | |
| 2012/0002544 A1 | 1/2012 | Kokku et al. | |
| 2012/0030232 A1 | 2/2012 | John et al. | |
| 2012/0046936 A1 | 2/2012 | Kandekar et al. | |
| 2012/0081506 A1 | 4/2012 | Marvit | |
| 2012/0102050 A1 | 4/2012 | Button et al. | |
| 2012/0110087 A1 | 5/2012 | Culver et al. | |
| 2012/0185239 A1 | 7/2012 | Goud et al. | |

OTHER PUBLICATIONS

U.S. Appl. No. 12/778,899, filed May 12, 2010, entitled "System and Method for Deriving User Expertise Based on Data Propagating in a Network Environment," Inventor(s): Virgil N. Mihailovici, et al.

U.S. Appl. No. 12/475,486, filed Jun. 3, 2009, entitled "Authentication via Monitoring," Inventors(s): David McGrew and Sandeep Rao.

Nortel Networks Wireless Solutions (A. Silver, J. Larkins, D. Stringer), "Unified Network Presence Management," A White Paper, © , 6 pages, www.mobilein.com/UNPM.pdf.

W.A. Montgomery, et al., "Network Intelligence for Presence Enhanced Communication," Spirits Working Group, May 2002, 9 pages, http://ietfreport.isoc.org/all-ids/draft-montgomery-copeland-presence-spirits-00.txt.

J. Kohl and C. Neuman, The Kerberos Network Authentication Service (V5), Network Working Group, RFC 1510, Sep. 1993, 105 pages, http://www.iett.org/rfc/rfc1510.

Lancope, "Stealth Watch, Revolutionize the Way You View Your Network," © 2009, 9 pages http://storage.pardot.com/2382/9637/SteathWatch_System_Family_Brochure.pdf.

E. Horvitz, et al., "Coordinate: Probabilistic Forecasting of Presence and Availability," 3003, 10 pages, ftp://ftp.research.microsoft.com/pub/ejh/coordinate.pdf.

Andreas Hess, et al., "Multi-Value Classification of Very Short Texts," 8 pages, printed on May 12, 2010; http://www.andreas-hess.info/publications/hess-ki08.pdf.

U.S. Appl. No. 13/182,862, filed Jul. 14, 2011 entitled "System and Method for Deriving user Expertise Based on Data Propagating in a Network Environment,". Inventor(s): Satish K. Gannu, et al.

Roselle Data Mining & Database Analytics, "Web Search and Web Navigation Pattern Analyzer," 3 pages; printed Jul. 25, 2011: http://222.roselladb.com/surf-pattern-analyzer.htm.

Caslon Analytics Echelon Note: Overview, May 2006, 6 pages; printed Sep. 30, 2009 http://www.caslon.com.au/echelonnote.htm.

Andreas Hess, et al, "From Web 2.0 to Semantic Web: A Semi-Automated Approach," 15 pages; printed Sep. 30, 2009; http://www.andreas-hess.info/publications/hess-cisweb08.pdf.

Wikipedia, "Homophone," 3 pages; printed Sep. 30, 2009; http://en.wikipedia.org/wiki/Homophone.

R. Billi et al., "Interactive Voice Technology at Work: The CSELT Experience," $2^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.

Wikipedia, "International Phonetic Alphabet," 19 pages; printed Sep. 30, 2009; http://en.wikipedia.org/wiki/International_Phonetic_Alphabet.

"The LNTS Leap: Phoneme Recognition," 2 pages; printed Sep. 30, 2009; http://www.Intstech.com.

NSA Watch, "Other Surveillance Network: Governmental Surveillance Agencies," 2 pages; printed Sep. 30, 2009; http://www.nsawatch.org/networks.html.

Nexidia, "Audio and Speech Analytics Software," 1 page; printed Sep. 30, 2009; http://www.nexidia.com.

Ronnie W. Smith, "Performance Measures for the Next Generation of Spoken Natural Language Dialog Systems," pp. 37-40; http://acl.ldc.upenn.edu/W/W97/W97-0607.pdf.

Wikipedia, "Phoneme," 7 page; printed Sep. 30, 2009; http://en.wikipedia.org/wiki/Phoneme.

N.S. Jadhav and I.N. Dwivedi, "Social computing based personal vocabulary building," 5 pages; printed Sep. 30, 2009; http://www.priorartdatabase.com/IPCOM/000173550/.

Carnegie Mellon University, "Speech at CMU," 4 pages; printed Sep. 30, 2009; http://www.speech.cs.cmu.edu/speech/.

Professor Anita Wasilewska, CSE 634—Data Mining: Text Mining; 85 pages; www.cs.sunysb.edu/~cse634/presentations/TextMining.pdf.

Trampoline Systems, "Navigation," 2 pages; printed Sep. 30, 2009; www.trampolinesystems.com.

Pete Swabey, "Making the Invisible Visible," 2 pages; Sep. 23, 2009; http://www.trampolinesystenns.com/news/in=the=news/archive/2009/59.

WebChoir Products—Personal Vocabulary Tools, "Personal Tools," 1 page; printed Sep. 30, 2009 http://www.webchoir.com/products/ptt.html.

U.S. Appl. No. 13/098,112, filed Apr. 29, 2011 entitled "*System and Method for Evaluating Visual Worthiness of Video Data in a Network Environment*", inventor(s): Deepti Patil et al.

U.S. Appl. No. 13/098,434, filed Apr. 30, 2011 entitled "System and Method for Media Intelligent Recording in a Network Environment ", inventor(s) Ashutosh A. Malegaonkar et al.

Virape, "Audio Analysis," Autonomy Virago, © 2009 Autonomy Virago, 1 page http://www.virage.com/security-and-surveillance/functions/audio-analysis/index.htm.

Virago, "Understanding Video," Autonomy Virage, © 2009 Autonomy Virago, 5 pages http://www.virage.com/rich-media/technology/understanding-video/index.htm.

U.S. Appl. No. 13/088,974, filed Apr. 18, 2011, entitled "System and Method for Providing Augmented Data in a Network Environment," inventor(s): Satish K. Garmu et al.

U.S. Appl. No. 13/160,701, filed Jun. 15, 2011 entitled "System and Method for Discovering Videos," Inventors(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

Ohl, Ricky, "Computer Supported Argument Visualisation: Modelling Wixked Problems," Ph.D. Thesis, Australian Digital Theses Program, Feb. 2008; 431 pgs.; http://gu.edu.au:8080/adt-root/public/adt-QGU20090724.155249/index.html.

U.S. Appl. No. 12/471,404 filed Sep. 30, 2009, entitled "System and Method for Generating Personal Vocabulary from Network Data," Inventor(s): Satish K. Gannu, et al.

U.S. Appl. No. 12/571,414, filed Sep. 30, 2009, entitled "System and Method for Providing Speech Recognition Using Personal Vocabulary in a Network Environment," Inventor(s): Satish K. Gannu, et al.

U.S. Appl. No. 12/571,421, filed Sep. 30, 2009, entitled "System and Method for Ensuring Privacy While Tagging Information in a Network Environment," Inventor(s): Satish K. Gannu, et al.

U.S. Appl. No. 12/571,426, filed Sep. 30, 2009, entitled "System and Method for Controlling an Exchange of Information in a Network Environment," Inventor(s): Satish K. Gannu, et al.

Grimes, Seth, "Sentiment Analysis: Opportunities and Challenges," Beye Network; Jan. 22, 2008; 6 pages; http://www.b-eye-network.com/view/6744.

iLogos v1.5 download (win); 4 pages [Retrieved and printed on May 28, 2010] from http://www.phil.com.edu/projects/arguments_mapping/.

Maybury, Mark et al., "Enterprise Expert and Knowledge Discovery," MITRE Technical Papers, The MITRE Corporation, Sep. 2000, 11 pages; http://www.mitre.org/work/tech_papers_00/maybury_enterprise.pdf.

Moorthi, Y. L. R., "Have Breakfast or Be Breakfast," Wall Street Journal, Feb. 8, 2010, 2 pages; http://online.wsj.com/article/SB126465641868236415.html#printMode.

Oliveira, Bruno et al., "Automatic Tag Suggestion Based on Resource Contents," Knowledge Engineering: Practice and Patterns, Lecture Notes in Computer Science, 2008, vol. 5268/2008, DOI:10.1007/978-3-54 [Abstract Only, 1 page]; http://www.springerlink.com/content/008w50405265r177/.

Trant, Jennifer, "Studying Social Tagging and Folksonomy: A Review and Framework," Jan. 2009, 10(1) Journal of Digital Information;42 pages; http://dlist.sir.arizona.edu/arizona/handle/10150/105375.

U.S. Appl. No. 12/971,852, filed Dec. 17, 2010 entitled "System and Method for Providing Argument Maps Based on Activity in a Newtwork Environment," Inventor(s): Deepti Patil, et al.

U.S. Appl. No. 12/971,946, filed Dec. 17, 2010 entitled "System and Method for Providing Feeds Based on Activity in a Network Environment," Inventors(s): Satish K. Gannu, et al.

Ohl, Ricky, "Computer Supported Argument Visulisation: Modelling Wicked Problems," Ph.D. Thesis, Australian Digital Theses Program, Feb. 2008; 431 pgs.; http://gu.edu:8080/adt-root/public/adt-QGU20090724.155249/index.html.

PCT Notification of Transmittal (1 page) of the International Search Report (3 pages), and Written *Opinion of the International Searching Authority, or the Declaration* (6 pages) Mailed Jan. 12, 2011 for PCT/US2010/050762.

Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.

Chen, Rung-Ching, et al., "Adding New Concepts on the Domain Ontology Based on Semantic Similiarity," International Conference on Business and Information, Jul. 12-14, 2006, XP002614339; 14 pages; http://bai2006.atisr.org/CD/Papers/2006bai6169.pdf.

Sethy, Abhinav, et al., "Building Topic Specific Language Models from Webdata Using Competitive Models," $9^{th}$ European Conference on Speech Communication and Technology, Eurospeech Interspeech 2005 International Speech and Communication Association Fr., 2005, pp. 1293-1296; XP 002614341; http://sail.usc.edu/publications/sethy-euro2005.pdf.

Lacher, Martin S., et al., "On the Integration of Topic Maps and RDF Data," Extreme Markup Languages 2001, 10 pages.

Wang, Xuerui, et al., "Topics over Time: A NonMarkov Continuous Time Model of Topical Trends," KDD'06, Aug. 20-23, 2006, 10 pages.

U.S. Appl. No. 13/364,102, filed Feb. 1, 2012 entitled "System and Method for Creating Customized On-Demand Video Reports in a Network Environment," Inventor(s): Deepti Patel, et al.

Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.

Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(53)-Event-Based-Video-Surveillance.

Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.

PCT Apr. 3, 2012 International Preliminary Report on Patentability and Wrtten Opinion of the International Searching Authority from International Application PCT/US2010/050762; 7 pages.

EPO Nov. 7, 2012 Response to Communication pursuant to Rule 161(1) and 162 from European Application No. 10770664; 8 pages.

PCT Oct. 4, 2012 Notification of Transmittal of the International Search Report and Written Opinion of the International Search Authority from Application PCT/US2012/040097; 15 pages.

Bollen, et al., "Usage Derived Recommendations for a Video Digital Library," Journal of Network and Computer Applications, Academic Press, New York, NY, vol. 30, No. 3, Mar. 16, 2007; 25 pages.

Umbrich J., et al., ""Four Heuristics to Guide Structured Content Crawling,"" Eighth International Conference on Web Engineering, 2008, Jul. 14, 2008; ©2008 IEEE DOI 10.1109/ICWE.2008.42.

Seher, Indra, "Query Expansion in Personal Queries," IADIAS (International Association for Development of the Information Society) 2006, 5 pages www.iadis.org/Multi2006/papers/16/5023_ISA.

Jiang, Weiliang, et al., "A Method for Personal Query Based on Role Preference Ontology," Industrial Mechanatronics and Automation, ICIMA 2009 International Conference, pp. 479-481; Abstract Only, 1 page.

U.S. Appl. No. 13/608,787 filed Sep. 10, 2012 entitled "System and Method for Enhancing Metadata in a Video Processing Environment," Inventor(s) Sandipkumar V. Shah, et al.

"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.

"Recommender System," Wikipedia, Apr. 28, 2012; 9 pages http://en.wikipedia.org/wiki/Recommender_system.

"Understanding Metadata," NISO Press, National Information Standards Organization, 2004, 20 pages.

Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.

Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.

Gligorov, User-generated Metadata in Audio-visual Collections, Proceedings of the International World Wide Web Conference, WWW 2012, Apr. 16-20, 2012, Lyon, France (2012); 5 pages.

Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.

Jain, et al., "Learning to Re-Rank: Query-Dependent Image Re-Ranking Using Click Data," Proceedings of the International World Wide Web Conference, WWW 2011, Mar. 28, 2011-Apr. 1, 2011, Hyderabad, India (2011); 10 pages.

Rodriguez, et al. Automatic Metadata Generation Using Associative Networks, ACM Transactions on Information Systems, vol. 27, No. 2, Article 7, Feb. 2009.

Telestream, Inc. Product Literature, "Extracting and Preparing Metadata to Make Video Files Searchable," Telestream, Inc. 2008; 6 pages.

Yuen, L., et al., "Excalibur: A Personalized Meta Search Engine," Computer Software and Applications Conference 2004, COMPSAC 2004 Proceedings of the 28th Annual International, 2 pages.

* cited by examiner

TEXT: APPLE MAC IS A COMPUTER
CONCEPT: APPLE MAC, COMPUTER

TEXT: THE GREEN APPLE IS GOOD
CONCEPT: GREEN APPLE

SYSTEM AND METHOD FOR GENERATING VOCABULARY FROM NETWORK DATA

TECHNICAL FIELD

This disclosure relates in general to the field of communications and, more particularly, to generating vocabulary from network data.

BACKGROUND

The field of communications has become increasingly important in today's society. In particular, the ability to effectively gather, associate, and organize information presents a significant obstacle for component manufacturers, system designers, and network operators. This obstacle is made even more difficult due to the plethora of poor speech patterns, slang, and improper grammar: all of which seems ubiquitous in today's corporate environments. As new communication platforms and technologies become available, new protocols should be developed in order to optimize the use of these emerging protocols. Some issues have arisen in data monitoring scenarios in which content (sought to be intelligently organized) propagates in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving data propagating in a network environment and separating the data into one or more fields. At least some of the fields are evaluated in order to identify nouns and noun phrases within the fields. The method also includes identifying selected words within the nouns and noun phrases based on a whitelist and a blacklist. The whitelist includes a plurality of designated words to be tagged and the blacklist includes a plurality of rejected words that are not to be tagged. A resultant composite is generated for the selected nouns and noun phrases that are tagged. The resultant composite is incorporated into the whitelist if the resultant composite is approved. In more specific embodiments, the fields include a title field, a concept field, a text field, and an authorship field. The method can split a document associated with the data into a first segment that includes the concept field and a second segment that includes the other fields. Additionally, one or more words in the data can be removed based on a configured listing of stop words, which are checked in the data. Also, words may be suggested for inclusion into the whitelist or the blacklist based on an aggregation of data associated with a plurality of end users.

Example Embodiments

Figure 1:
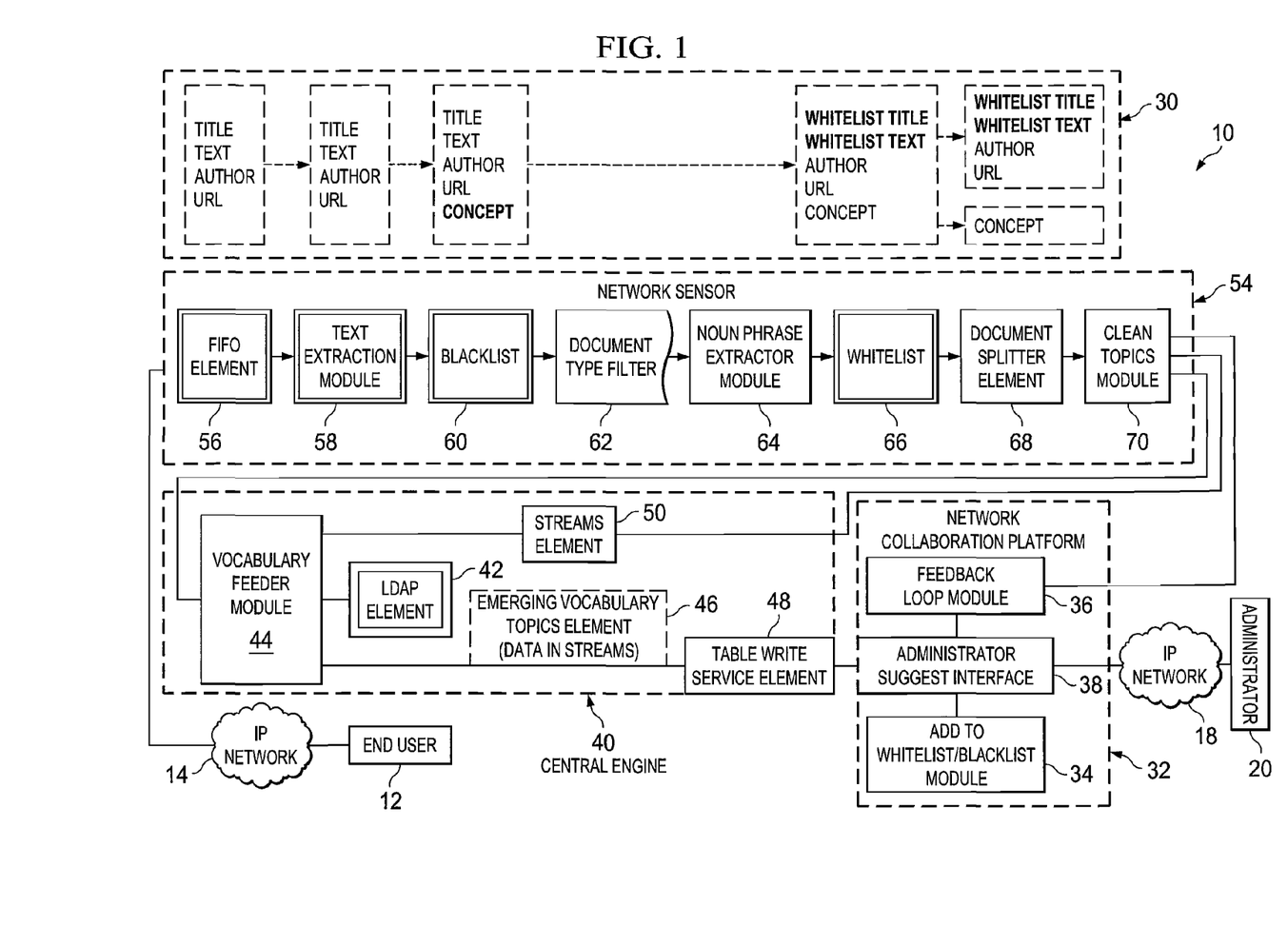
FIG. 1 is a simplified block diagram of a communication system for generating vocabulary from network data in accordance with one embodiment.

FIG. 1 is a simplified block diagram of a communication system 10 for generating vocabulary from network data. FIG. 1 may include an end user 12, who is operating a computer device that is configured to interface with an Internet Protocol (IP) network 14. In addition, an administrator 20 is provided, where administrator 20 has the ability to interface with the architecture through an IP network 18. Also provided in conjunction with FIG. 1 is an example workflow 30 that tracks a document (and its content) as it is received and intelligently processed through communication system 10.

Communication system 10 may further include a network collaboration platform (NCP) 32, which includes an add to whitelist/blacklist module 34, a feedback loop module 36, and an administrator suggest interface 38. FIG. 1 may also include a central engine 40, which includes a lightweight directory access protocol (LDAP) element 42, a vocabulary feeder module 44, a streams element 50, an emerging vocabulary topics element 46, and a table write service element 48.

FIG. 1 may also include a network sensor 54 that includes a first in, first out (FIFO) element 56, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, etc.

Note that before turning to the example flows and infrastructure of example embodiments of the present disclosure, a brief overview of the workflow of the architecture is provided. Certain automatic vocabulary generation protocols attempt to solve the problem of manually building a vocabulary. Most approaches are time consuming, inflexible, and difficult to manage (e.g., in the context of adding/deleting/modifying terms for a whitelist, a blacklist, etc.). Communication system 10 can offer an architecture that provides an effective tagging for content propagating through a given network. Such an architecture offers flexibility in that it can be configured to protect employee privacy and sensitive content, for example, where only content that matches a controlled business vocabulary is extracted and suitably indexed.

In addition, communication system 10 offers a vocabulary building mechanism that is aligned with the evolving vernacular of a business. This can mean that (in one general sense), the controlled vocabulary is a living entity that automatically and rapidly evolves with new/emerging business content. One aspect of the architecture involves a noun phrase extraction component, which can be provided along with filtering mechanisms, and stream access counts to retrieve popular and/or new vocabulary terms.

In one example implementation, the premise can include having the architecture suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Turning to the infrastructure of FIG. 1, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Note that network sensor 54 can readily be part of a server in certain embodiments of this architecture. In one example implementation, network sensor 54 is a network element that facilitates or otherwise helps coordinate the vocabulary building operations, as explained herein. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, network sensor 54 includes software (e.g., as part of noun phrase extractor module 64) to achieve the vocabulary building operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1 may include any suitable algorithms, hardware, software, components, modules, interfaces, or objects that facilitate these vocabulary building operations. Additional operational capabilities of communication system 10 are detailed below with respect to FIGS. 2-3.

Figure 2:
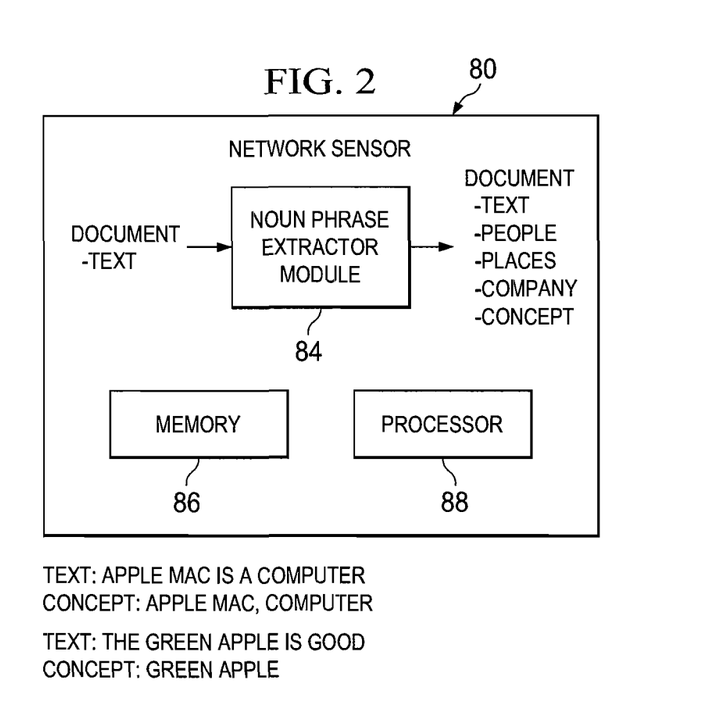
FIG. 2 is a simplified block diagram of example extractions that may occur in the communication system in accordance with one embodiment.

Turning to FIG. 2, FIG. 2 is a simplified block diagram of an example implementation of a network sensor 80, which is processing several example documents using noun phrase extractor module 84. Network sensor 80 includes a memory element 86 and a processor 88 in this particular configuration. In operation of a simplified example used for discussion purposes, the extraction and processing operations can be performed on network sensor 80, where those results may be later provided to NCP 32, to a suitable administrator interface, etc. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] As depicted in FIG. 2, a "concept" field can be created and this contains a list of the noun phrases extracted from the document (e.g., separated by commas). In the first example, the concept field contains tokens such as: [Text] Apple Mac is a computer; [Concept] Apple Mac, computer. In the second example, the concept field contains tokens such as: [Text] The green apple is good; [Concept] green apple.

In one example, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. Also, most search queries are noun phrases included in some given subject area. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent over to central engine 40. The concept field can be accessible like other fields in the received/collected documents. The concept field is a list of string field values. Additional functionalities associated with these operations are best understood in the context of several examples provided below.

Figure 3:
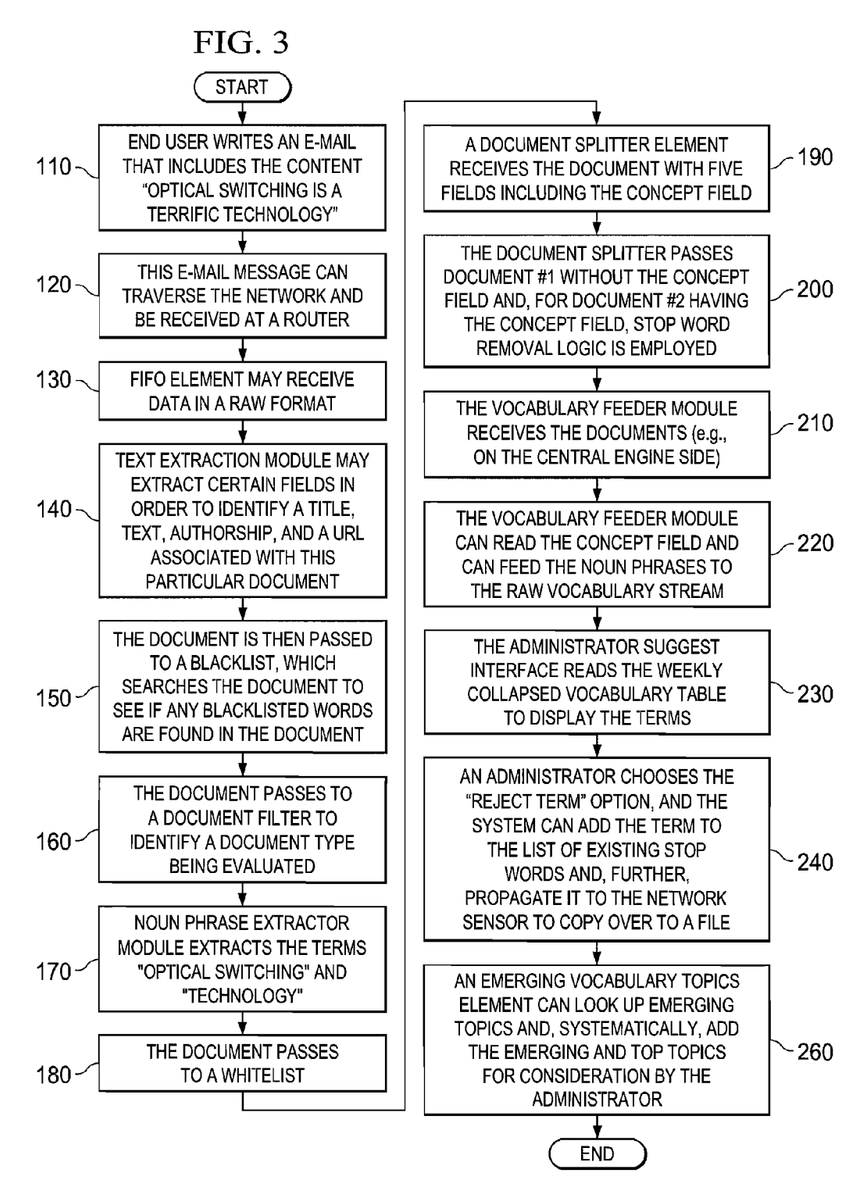
FIG. 3 is a simplified flowchart illustrating a series of example steps associated with the communication system.

FIG. 3 is a simplified flowchart illustrating one example operation associated with communication system 10. FIG. 3 can be discussed in conjunction with workflow 30, which can track certain operations associated with communication system 10. In this particular flow, at step 110, end user 12 has written an e-mail that includes the content "Optical Switching is a terrific technology." This e-mail message can traverse the network and be received at a router (e.g., a large corporate router, a switch, a switched port analyzer (SPAN) port, or some type of virtual private network (VPN) network appliance). This is reflected by step 120. Network sensor 54 can be provisioned at such a location in order to capture data and/or facilitate the identification of content, as described herein.

In this particular example, FIFO element 56 may receive data in a raw format at step 130. Text extraction module 58 may extract certain fields in order to identify a title, text, authorship, and a uniform resource locator (URL) associated with this particular document at step 140. Note that for this particular instance (where an e-mail is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 170. It should also be noted that in workflow 30 of FIG. 1, the concept has been identified at this stage.

Once this document has propagated through noun phrase extractor module 64, the document passes to whitelist 66 at step 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that in workflow 30, there are two documents being created from the original document. In one instance, document splitter element 68 can receive a document with five fields including the concept field (at step 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., e-mail) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 200. In this particular arrangement, the following stop words (which could be found in a stop word list) can be removed: first name, last name, userid; functional stop word: A, an, the, etc.; e-mail stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering e-mail (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing e-mail stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side) at step 210. Vocabulary feeder module 44 forwards the document without the concept field and, for the document with the concept field, it sends it to streams element 50. In one instance, the streams can be associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file) at step 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 230. This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to network sensor 54 to copy over to a file (e.g., adminStopWords.txt). This is reflected by step 240. Network collaboration platform 32 can create a file from the table suggested vocabulary terms (e.g., via commands including suggestedby=system, and status=rejected). This file can be a part of the force sync files that can be pushed to the network sensor/central engine (depending on where the stop words mechanism resides). At step 260, emerging vocabulary topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

Note that one use of the resulting data is to create a dynamic file for each individual user that is tracked, or otherwise identified through communication system 10. Other applications can involve identifying certain experts in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing intelligent vocabulary building can be provided at various locations. In one example implementation, this software is resident in a network element, such as network sensor 54, or in another network element for which this capability is relegated. In other examples, this could involve combining network sensor 54 with an application server or a gateway, or some proprietary element, which could be provided in (or be proximate to) these identified network elements, or this could be provided in any other device being used in a given network.

In other embodiments, the vocabulary-building feature may be provided externally to network sensor 54, or included in some other network device, or in a computer to achieve these intended functionalities. As identified previously, a network element can include software to achieve the vocabulary building operations, as outlined herein in this document. In certain example implementations, the vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building operations as outlined herein. Additionally, each of these devices may include a processor that can execute software or an algorithm to perform the vocabulary building activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

As noted previously, one configuration of communication system 10 gathers information from end users, as information travels through the network. In one instance, concepts presented herein can introduce two main capabilities to a network element (e.g., a router or a switch). First, network elements can be augmented with information extraction capabilities. Information extraction can include various mechanisms to extract useful information from network traffic. This could include extracting textual information from network traffic, such as email and web traffic. The process could also include reconstructing documents carried by various email protocols (e.g., Microsoft Exchange, SMTP) or HTTP (for web traffic) and, subsequently, perform document text extraction (e.g., extract text from a PDF file, or extract text info from a Microsoft Word file). It can also include extracting text information from rich media traffic (e.g., extract text from a video sound track via speech-to-text technology).

Secondly, network elements can be augmented with real-time stream based analytical processing capabilities. A substantial amount of analytical information can be obtained in real-time, as the raw data is received on a network element. This is because, for most use cases, a user is interested in aggregated information. Such an approach can improve the efficiency of an overall system, in contrast to "store-and-process" methods.

In one configuration, a pipelined information processing architecture can be configured, where the pipeline stages are as follows: network collector, packet analyzer, secure protocol, text analyzer, secure protocol, network connector, index, etc. In terms of a network collector, packets can enter the network element (router/switch blade/span port, etc.) and be subsequently evaluated by a packet analyzer. The packet analyzer (e.g., a TCP normalizing element) normalizes the TCP flow and, further, an application-recognition engine could recognize the application (e.g., http/SIP/email/SMTP, etc.). An application can parse information as it flows into the system, where it would further construct documents (text/attachments, etc.) along with meta information. A normalized document can then be sent over a secure protocol to a text analyzer.

The text analyzer can perform several operations, including: stop word removal, whitelist filter/blacklist dropper, entity extraction vocabulary generation, semantic analyzer, etc. such that a tagged normalized document is sent over a secure protocol to an Index Writer (or to some other appropriate destination). A network connector can create a metadata repository for searching activities. The repository can be local to the Index Writer, or provided on a storage area network (SAN), etc. The architecture can include separated logical blocks that can run in a single machine, or be provided in a distributed manner.

Note that certain embodiments presented herein can offer a number of advantages. For example, most user activity happens through the network. Existing information-discovery methods generally rely on document-crawling operations performed on a document repository. However, as more work is performed over the web, a majority of information (a given end user accesses/processes) can be on some form of the web (i.e., an enterprise internal web portal, external web sites, etc.). Because of the distributed nature of web sites, a crawling document repository method does not work for many applications. In contrast, communication system 10 (in certain embodiments) is configured to acknowledge that important enterprise information (email, web traffic, etc.) can travel through a network element. Thus, a network element becomes the best vantage point to observe dynamic information in an enterprise, as explained herein.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:
1. A method, comprising:
receiving data propagating in a network environment;
sorting the data into a first group and a second group, wherein the first group includes Joint Photographic Experts Group (JPEG) compressed data, and wherein the first group is ignored;
separating the data in the second group into one or more fields;
evaluating, using a processor, at least some of the fields in order to identify nouns and noun phrases within the fields;

identifying selected words within the nouns and noun phrases based on a whitelist and a blacklist, wherein the whitelist includes a plurality of designated words to be tagged and the blacklist includes a plurality of rejected words that are not to be tagged;

dropping the data if certain words in the data are included in the blacklist;

generating a first resultant composite of selected nouns and noun phrases that are tagged;

identifying selected words within the first resultant composite of selected nouns and noun phrases based on a list of administrator stop words;

removing the identified selected words to create a second resultant composite of selected nouns and noun phrases;

presenting the second resultant composite of selected nouns and noun phrases to an administrator; and incorporating selected nouns and noun phrases from the second resultant composite into the whitelist if the selected nouns and noun phrases are approved by the administrator.

2. The method of claim 1, wherein the fields include a title field, a concept field, a text field, and an authorship field.

3. The method of claim 2, further comprising:
splitting a document associated with the data into a first segment that includes the concept field and a second segment that includes fields other than the concept field.

4. The method of claim 1, further comprising:
removing one or more words in the data based on a configured listing of stop words, which are identified in the data.

5. The method of claim 1, further comprising:
suggesting words for inclusion into the whitelist or the blacklist based on an aggregation of data associated with a plurality of end users.

6. The method of claim 1, further comprising:
identifying topical areas within the data; and
providing the topical areas to an administrative entity for inclusion into the first resultant composite.

7. The method of claim 1, further comprising:
filtering the data based on a document type associated with the data.

8. Logic encoded in one or more non-transitory media that includes code for execution and when executed by a processor is operable to perform operations comprising:
receiving data propagating in a network environment;
sorting the data into a first group and a second group, wherein the first group includes Joint Photographic Experts Group (JPEG) compressed data, and wherein the first group is ignored;
separating the data in the second group into one or more fields;
evaluating at least some of the fields in order to identify nouns and noun phrases within the fields;
identifying selected words within the nouns and noun phrases based on a whitelist and a blacklist, wherein the whitelist includes a plurality of designated words to be tagged and the blacklist includes a plurality of rejected words that are not to be tagged;
dropping the data if certain words in the data are included in the blacklist;
generating a first resultant composite of selected nouns and noun phrases that are tagged;
identifying selected words within the first resultant composite of selected nouns and noun phrases based on a list of administrator stop words;
removing the identified selected words to create a second resultant composite of selected nouns and noun phrases;
presenting the second resultant composite of selected nouns and noun phrases to an administrator; and
incorporating selected nouns and noun phrases from the second resultant composite into the whitelist if the selected nouns and noun phrases are approved by the administrator.

9. The logic of claim 8, wherein the fields include a title field, a concept field, a text field, and an authorship field.

10. The logic of claim 9, the processor being further operable to perform operations comprising:
splitting a document associated with the data into a first segment that includes the concept field and a second segment that includes fields other than the concept field.

11. The logic of claim 8, the processor being further operable to perform operations comprising:
removing one or more words in the data based on a configured listing of stop words, which are identified in the data.

12. The logic of claim 8, the processor being further operable to perform operations comprising:
suggesting words for inclusion into the whitelist or the blacklist based on an aggregation of data associated with a plurality of end users.

13. The logic of claim 8, the processor being further operable to perform operations comprising:
identifying topical areas within the data; and
providing the topical areas to an administrative entity for inclusion into the first resultant composite.

14. The logic of claim 8, the processor being further operable to perform operations comprising:
filtering the data based on a document type associated with the data.

15. An apparatus, comprising:
a memory element;
a processor operable to execute instructions; and
a noun phrase extractor module configured to interface with the memory element and the processor, the noun phrase extractor module being configured to:
receive data propagating in a network environment;
sort the data into a first group and a second group, wherein the first group includes Joint Photographic Experts Group (JPEG) compressed data, and wherein the first group is ignored;
separate the data in the second group into one or more fields;
evaluate at least some of the fields in order to identify nouns and noun phrases within the fields;
identify selected words within the nouns and noun phrases based on a whitelist and a blacklist, wherein the whitelist includes a plurality of designated words to be tagged and the blacklist includes a plurality of rejected words that are not to be tagged;
drop the data if certain words in the data are included in the blacklist;
generate a first resultant composite of selected nouns and noun phrases that are tagged;
identify selected words within the first resultant composite of selected nouns and noun phrases based on a list of administrator stop words;
remove the identified selected words to create a second resultant composite of selected nouns and noun phrases;
present the second resultant composite of selected nouns and noun phrases to an administrator; and incorporate selected nouns and noun phrases from the second resultant composite into the whitelist if the selected nouns and noun phrases are approved by the administrator.

16. The apparatus of claim 15, wherein the fields include a title field, a concept field, a text field, and an authorship field.

17. The apparatus of claim 16, further comprising:
a document splitter configured to split a document associated with the data into a first segment that includes the concept field and a second segment that includes fields other than the concept field.

18. The apparatus of claim 15, further comprising:
a user interface configured to suggest words for inclusion into the whitelist or the blacklist based on an aggregation of data associated with a plurality of end users.

19. The apparatus of claim 18, wherein topical areas are identified within the data and provided to an administrative entity at the user interface for inclusion into the first resultant composite.

20. The apparatus of claim 15, further comprising:
a document filter configured to filter the data based on a document type associated with the data.

21. A system, comprising:
a network element that includes a memory element and a processor operable to execute instructions, wherein the network element is configured to:
receive data propagating in a network environment;
sort the data into a first group and a second group, wherein the first group includes Joint Photographic Experts Group (JPEG) compressed data, and wherein the first group is ignored;
separate the data in the second group into one or more fields;
evaluate at least some of the fields in order to identify nouns and noun phrases within the fields;
identify selected words within the nouns and noun phrases based on a whitelist and a blacklist, wherein the whitelist includes a plurality of designated words to be tagged and the blacklist includes a plurality of rejected words that are not to be tagged;
drop the data if certain words in the data are included in the blacklist;
generate a first resultant composite of selected nouns and noun phrases that are tagged;
identify selected words within the first resultant composite of selected nouns and noun phrases based on a list of administrator stop words;
remove the identified selected words to create a second resultant composite of selected nouns and noun phrases;
present the second resultant composite of selected nouns and noun phrases to an administrator;
incorporate selected nouns and noun phrases from the second resultant composite into the whitelist if the selected nouns and noun phrases are approved by the administrator; and
maintain a repository that includes the second resultant composite, wherein the repository is configured to receive one or more search queries associated with designated subject areas.

22. The system of claim 21, wherein the network element is configured to:
remove one or more stop words associated with the data propagating in the network environment, wherein the stop words are included in a stop word list.

23. The system of claim 21, wherein the fields include a title field, a concept field, a text field, and an authorship field.

24. The system of claim 21, wherein the network element is configured to:
reconstruct documents carried by an email protocol.

25. The system of claim 21, wherein the network element is configured to:
recognize an application associated with a document relating to the data propagating in the network.

26. The system of claim 21, wherein the network element is configured to:
split a document associated with the data into a first segment that includes the concept field and a second segment that includes fields other than the concept field.

27. The system of claim 21, wherein the network element is configured to:
incorporate the selected nouns and noun phrases into the whitelist if the selected nouns and noun phrases are approved.

28. The system of claim 21, wherein the network element is configured to:
communicate a tagged document over a secure protocol to a next destination.

29. The system of claim 21, wherein the network element is configured to:
suggest words for inclusion into the whitelist or the blacklist based on an aggregation of data associated with a plurality of end users.

* * * * *